(12) United States Patent
Dietrich

(10) Patent No.: US 8,778,430 B2
(45) Date of Patent: Jul. 15, 2014

(54) METHOD FOR DEVILED EGG PREPARATION AND PRESENTATION

(71) Applicant: Nancy Dietrich, Del Mar, CA (US)

(72) Inventor: Nancy Dietrich, Del Mar, CA (US)

( * ) Notice: Subject to any disclaimer, the term of this patent is extended or adjusted under 35 U.S.C. 154(b) by 0 days.

(21) Appl. No.: 13/906,334

(22) Filed: May 30, 2013

(65) Prior Publication Data

US 2013/0263558 A1    Oct. 10, 2013

Related U.S. Application Data

(63) Continuation-in-part of application No. 13/355,894, filed on Jan. 23, 2012, now abandoned.

(51) Int. Cl.
*B65D 81/34* (2006.01)

(52) U.S. Cl.
USPC ............ 426/394; 426/110; 426/115

(58) Field of Classification Search
USPC .......... 426/106, 110, 112, 115, 120, 87; 206/521.1, 526, 459.5, 541; 220/4.26, 220/4.21
See application file for complete search history.

(56) References Cited

U.S. PATENT DOCUMENTS

| | | | | | |
|---|---|---|---|---|---|
| 3,484,035 | A | * | 12/1969 | Swett et al. | 220/508 |
| 3,573,068 | A | * | 3/1971 | Polselli | 426/87 |
| 3,843,825 | A | * | 10/1974 | Hawley | 426/393 |
| 4,143,465 | A | * | 3/1979 | White | 42/112 |
| 4,216,862 | A | * | 8/1980 | Daenen | 206/541 |
| 4,545,487 | A | * | 10/1985 | Asmus | 206/508 |
| 4,600,592 | A | * | 7/1986 | Dobis | 426/112 |
| 4,795,033 | A | * | 1/1989 | Duffy | 206/457 |
| 4,842,143 | A | * | 6/1989 | McKee et al. | 206/521.1 |
| 4,844,330 | A | * | 7/1989 | Roosa et al. | 229/120.06 |
| 4,848,579 | A | * | 7/1989 | Barnes et al. | 206/508 |
| 4,961,500 | A | * | 10/1990 | Coulombe | 206/366 |
| 5,312,634 | A | * | 5/1994 | Griesbach et al. | 426/106 |
| 6,305,546 | B1 | * | 10/2001 | Saunders et al. | 206/541 |
| D450,574 | S | * | 11/2001 | Campbell | D9/707 |
| D569,268 | S | * | 5/2008 | Markowicz et al. | D9/715 |
| 2002/0015767 | A1 | * | 2/2002 | Ishizaki | 426/115 |
| 2003/0087015 | A1 | * | 5/2003 | Wyslotsky et al. | 426/397 |
| 2008/0063759 | A1 | * | 3/2008 | Raymond et al. | 426/127 |
| 2009/0004336 | A1 | * | 1/2009 | La et al. | 426/85 |
| 2011/0259897 | A1 | * | 10/2011 | Coursey et al. | 220/592.03 |

FOREIGN PATENT DOCUMENTS

JP    2-177859    *    7/1990    ............. A21D 15/08

OTHER PUBLICATIONS ljcfyi, Deviled Egg Kit, [on line] May 2005, retrieved on Apr. 23, 2012. Retrieved from the Internet: URL<http://www.ljcfyi.com/2005_07_01_archive.html>.*

Deviled Egg Kit, Saunders Eggs, [on line] Oct. 2004, retrieved on Apr. 23, 2012. Retrieved from the Internet: URL<http://web.archive.org/web/20041019014220/http://www.saundereggs.com/products.html#DeviledEggs>.*

(Continued)

*Primary Examiner* — Rena Dye
*Assistant Examiner* — Chaim Smith
(74) *Attorney, Agent, or Firm* — Donn K. Harms

(57) ABSTRACT

A method for the sale, transport, and display of prepared hard boiled and deviled eggs, employing a container which is configured for both storage and transport of boiled eggs is provided. The container features a first half having a receiving cavity which engages a second half providing a cover for eggs located within sectioned cavities in the receiving cavity. Flavorings with labels or other placeable indicia are provided so that egg fillings in the eggs in different sections may be flavored and identified by the labels or placeable indicia provided with the flavoring. Eggs with pre-prepared flavorings may be purchased in removably engageable sections separate from the container and later engaged therein.

11 Claims, 3 Drawing Sheets

(56) References Cited

OTHER PUBLICATIONS

Deviled Egg Kit, Saunder Eggs, [on line] Dec. 2005, retrieved on Apr. 23, 2012. Retrieved from the Internet: URL<http://web.archive.org/web/20051215100945/http://saudereggs.com/products.html>.*

Deviled Egg Kit, Suter Company Inc., [on line], retrieved on Apr. 23, 2012. Retrieved from the Internet: URL<http://www.suterco.com/products.html#egg>.*

Deviled Egg Kit, Willamette Egg Farms 2008 no month given, [on line], retrieved on Apr. 23, 2012. Retrieved from the Internet: URL<http://willametteegg.site.aplus.net/page.php?id=37>.*

* cited by examiner

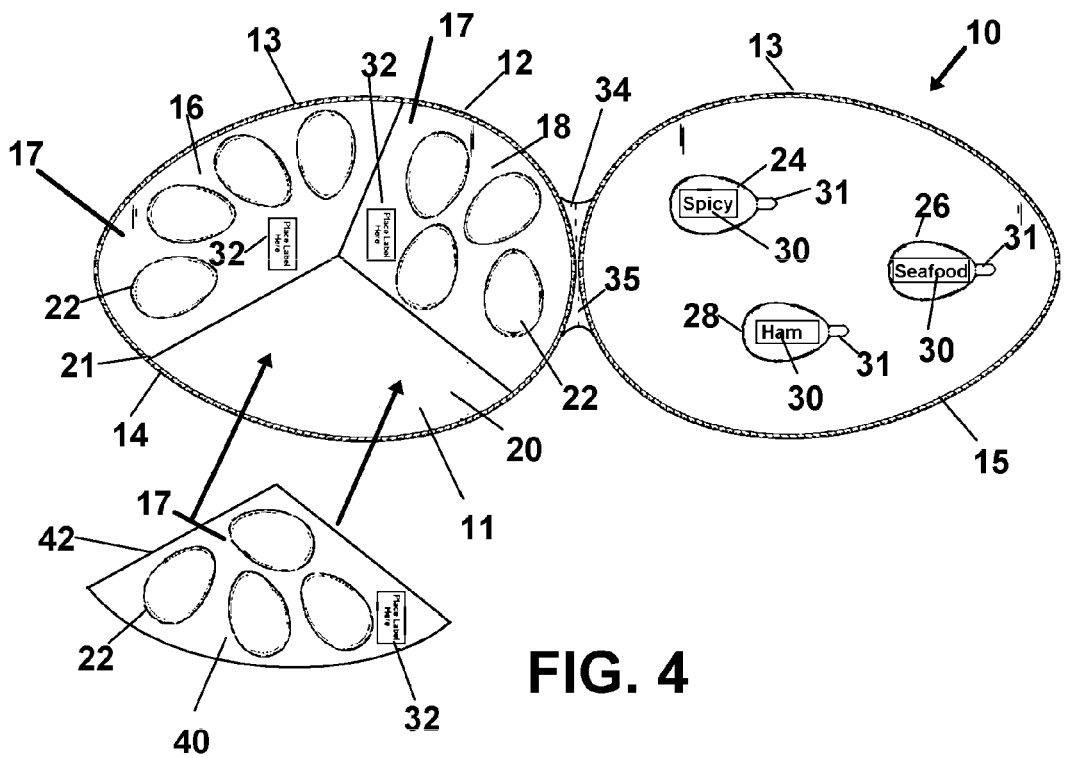
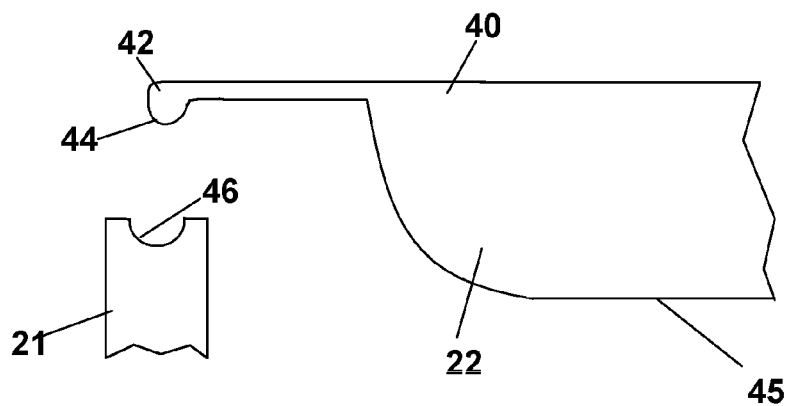
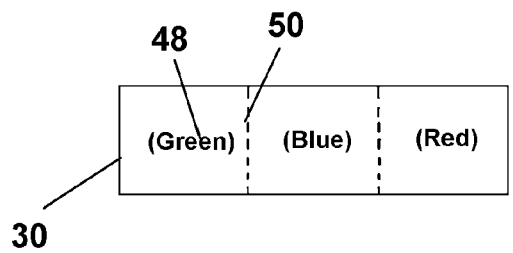

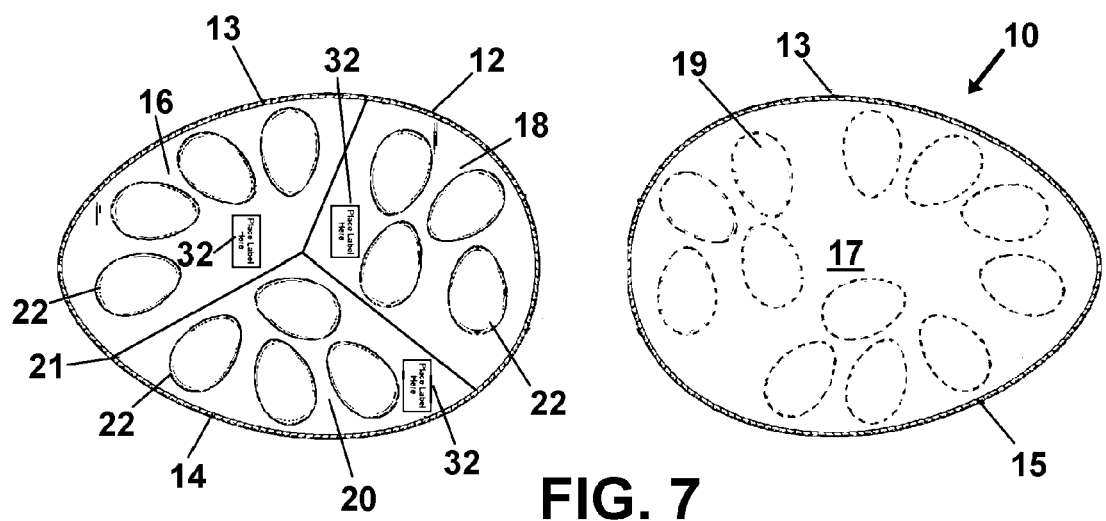
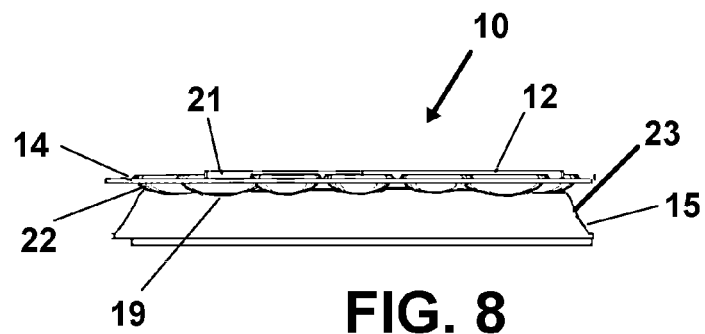

METHOD FOR DEVILED EGG PREPARATION AND PRESENTATION

This application is a continuing in part application from U.S. patent application Ser. No. 13/355,894 filed on Jan. 23, 2012, now abandoned, and incorporated herein in its entirety by reference.

BACKGROUND OF THE INVENTION

1. Field of the Invention

The present invention relates to food and containers therefore. More particularly, it relates to a method for sale and distribution of deviled eggs using a convenient multi-function food display, preparation tray, and transport device providing a means for cold storage prior and after preparation, and providing a means to organizationally present prepared deviled eggs or other similar egg dishes at meals. To aid in preparation and increase recipe variety, the device and method herein further provide the user one or a plurality of prepackaged packets of filling mixtures with each having removably engageable display of indicia, such as a sticker, for labeling the filling type of adjacent displayed egg foods.

2. Prior Art

Eggs have been and continue to be, a food staple for many people primarily because they provide a convenient meal while being healthy and full of protein. A user's personal preference will most always dictate the best method for egg preparation whether it is for breakfast, lunch, or dinner.

A widely employed method for preparing eggs, which is often seen as an appetizer or side dish at picnics, events, dinners, and parties, is the deviled egg, also called egg mimosa. Typically a deviled egg consists of hard-boiled eggs sliced in half which have an internal cavity filled with the hard-boiled egg's yolk which formerly occupied the space. The cooked yolk is conventionally mixed with condiments such as mayonnaise, mustard, and other spices or seasonings for flavor.

Since the hard-boiled egg halves are, by nature, curved or rounded, transporting and presenting a plurality of deviled eggs with the filling side up can be a difficult task. Prepared deviled eggs placed on a flat dish, when transported, will tend to slide or move due to the minimal curved surface contacting the plate. Further, eggs must be covered to prevent spoilage in transport and most covers frequently contact the filling mixture and can yield somewhat of a mess when the cover is removed. Presenting the eggs to eaters on a flat plate can frequently cause the egg halves to tip when bumped or moved by an eater, which can cause the filling to spill out.

As one conventional solution, manufacturers have conventionally provided deviled egg trays having indentations or recesses in the top surface. These recesses are shaped with the general curve of the exterior of a hard-boiled egg. Positioning a boiled egg in such recesses increases the surface contact with the exterior of the egg, and lowers the bottom below the edge of the recess. This increased contact and the edge of the recesses provide a means to conveniently and securely hold a plurality of deviled egg halves for display at a party or other event where they may be presented.

Many chefs and cooks pride themselves on their recipe for deviled egg fillings. Some typical flavorings for deviled eggs include garlic, horseradish, wasabi, cheese, chutney, capers, curry, salsa, hot sauce, ham, green chilies, jalapenos, mushrooms, spinach, guacamole, sour cream, caviar, smoked salmon or other seafood, and sardines.

However, an additional problem which occurs with conventional display trays is that they lack any means for filling ingredient display to guests who consume the displayed eggs. Consumers with food allergies to certain ingredients are thus unaware of the ingredients in the deviled egg they may be choosing to consume since it is typically difficult to discern the ingredients within the generally well-mixed filling. Further, at events such as dinners, parties, or pot lucks, the person who cooked or brought the deviled eggs may not be available to answer questions about the egg filling preparation and its contents. As a result, the consumer with allergies or food dislikes may decide to pass on a harmless and delicious deviled egg simply out of a fear of the potential ingredients which may have been employed in the filling. Alternatively, if the consumer takes the risk, they may have a potentially deadly allergic reaction.

Still further, the boiled egg is a hard cooking act to master for most people. Such is probably the result of the very infrequent preparation of boiled eggs by most people cooking them. Overcooked eggs can have a green tinge to the yolk. Undercooked eggs can be too soft or be easily spoiled. Improper cooling of the eggs upon finishing cooking, can lead to cracked shells, and shells which are hard to remove from the eggs themselves.

Consequently, when users attempt to make deviled eggs, usually in larger quantities due to a party or potluck destination for such egg shaped delicacies, their problems and incorrect cooking methods are only magnified. Thus the makings for the deviled eggs to be displayed to eaters, can turn out less than satisfactory due to the poor or mistaken cooking of the primary boiled egg ingredients. As such, cooks will avoid the task due to the uncertainty of the outcome, and eaters will not be offered a very healthy food. If there were an organized manner to sell and display cooked eggs filled or with ready to fill filling provided, which easily interfaced with display or dishware adapted for deviled eggs, more would be sold and consumed.

As such, there is a continuing unmet need for a deviled egg device enabling a method for preparation, sale, and distribution, which provides for ease of purchase by eaters and cooks, along with ease of display for eaters, using a container providing secure transport, and display of the pre-prepared eggs. Such a device and the method employed to cook, sell, and distribute the deviled eggs, should additionally provide a means for identifying a plurality of flavors of deviled eggs presented on the tray configured to engage the purchased eggs. Still further, such a device and method should endeavor to ease the amount of time and skill which a person cooking such deviled eggs requires. Finally, such a method should employ a system and device to provide users with a wide variety of fillings which may be potentially employed with the boiled eggs, which most users would never attempt due to their cooking abilities.

SUMMARY OF THE INVENTION

The method herein disclosed employing the device described and disclosed to enable the method, provides a solution to the shortcomings in prior art in display and transport of deviled eggs. These goals are achieved through the provision of a food tray device conveniently adapted to both a store selling the precooked eggs, and for secure transport of the purchased eggs, and for an interface with a display tray allowing the user to simply engage the trays of purchased eggs into a display configured for engagement with the tray, which can then display the deviled eggs. Thus the provided trays may be used both before sale for placement of cooked eggs thereon, during the sale in the store cooler, and for display to eaters after purchase.

The device is generally defined by a display body formed in a preferably egg shaped clamshell style yielding a removable, reusable, and recyclable folding tray for the sold and displayed eggs, having a plurality of indentations or recess on a first side adapted to nest the rounded exterior surface of a hard-boiled egg half therein.

On a second side of the clamshell style body, if sold with empty egg halves, may be provided one or a plurality of prepackaged packets or containers having one or different prepared flavors or seasoned fillings. The second side is configured to removably engage the packages of seasoned fillings therein for sale after preparation and transport.

In a particularly preferred mode of the device, a plurality of recesses configured to hold the prepared deviled eggs are separated into at least two distinct and discernible sections. For example, the tray body of the device may have 12 total recesses, with these recesses separated into three distinct sections with each having four sectioned recesses. This sectioning as noted below, allows for an organized and labeled presentation of the displayed eggs to eaters.

In accordance with a preferred mode of the device the tray is egg shaped, namely, as having a substantially egg-shaped perimeter. This serves a function two fold. First, the shape infers the contents of the tray. And second, it is widely known that egg shape as found in nature is very strong, therefore the egg-shaped perimeter of the folded tray, also provides a substantially strong structure. This is of great advantage in that the egg contents will be protected during transport, storage, and display.

In use, the clamshell body may be employed as a transport and store-displayed container for the unprepared eggs and fillings. Thereafter the clamshell body is employable to transport both the unprepared eggs and the filled eggs in a manner to where they are covered by a distanced cover which prevents contact with the filling but maintains the prepared eggs clean and unspoiled.

Prior to final preparation of the unprepared eggs, the two sections of the egg shaped clamshell style body are also employable as a means to display the easily prepared egg halves adjacent to a plurality, such as three, of different prepared flavored or seasoned fillings in quantities adapted to fill the recesses on the egg halves. Further, in accordance with the preferred mode of the device, once the eggs have been prepared with the labeled prepared filling, a means for labeling the different flavors of adjacent positioned filled eggs is provided.

In the unprepared mode of employment of the device, a user is provided with easy opening packets, containers, or the like, having premixed flavorings or spices stored therein. In a first preferred mode, the flavorings may be dry spices and ingredients such as salt, pepper, paprika, etc. intended to be mixed with the hard-boiled egg yolk, and wet ingredients such as mayonnaise and mustard, provided by the user. In another particularly preferred mode, which would be desirable to those who are recipe-challenged, the packets may contain the fully mixed moist and dry ingredients to fill a plurality of the egg halves positioned in the other half of the clamshell body. This allows the user to simply squeeze the mixture into the recesses of a plurality of egg halves and to close the egg-shaped clamshell style for transport and later display.

In all preferred modes of the disclosed device and method, users can be provided with indicia which is shown as one or a plurality of labels detailing the flavor and/or a list of ingredients of the fillings. Other means of imparting indicia to the device may be employed such as silkscreen or inkjet or pad printing during manufacture so as to provide the user or buyer an easy means to identify flavors types of eggs and/or egg filling ingredients. The labels or other labeling means are positionable in sections of the other half of the egg-shaped clamshell body adjacent to eggs which contain the ingredients identified. As such once a user prepares the egg halves with the provided packaged ingredients on one side of the tray, they may later be displayed adjacent to indicia or labels on the other side of the clamshell folding body of the device.

In accordance a particularly preferred mode of the device, the indicia identifying the adjacently presented filled eggs are stickers or labels positioned along side or engaged to the ingredient packets. In use, the user is either provided with a ready to use sticker or other means to label the flavor or contents of the eggs in sections, or they may simply disengage the sticker from the packet for placement on the correct sectionalized portion of the tray display device.

In yet an additional preferred mode of the device, the individual sections formed in smaller subsections, having a plurality of recess are removable engageable within the corresponding discernable sections of the first half of the tray. As such, the present invention provides for a sales and use method wherein replaceable tray segments, being members of a kit or group forming the tray, may be purchased by the consumer after the initial tray device is purchased. These replaceable tray segments can include prepared or unprepared egg halves that are sealed and sold separately to the tray itself. Therefore, the device can be provided and employed as a system wherein a user purchasing the two halves forming the initial device, can at the same time, or subsequently, purchase additional tray segments with ready to eat or ready to prepare deviled egg halves, that can simply be dropped into the corresponding section on the tray.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the concept upon which this disclosure is based may readily be utilized as a basis for designing of other structures, methods and systems for carrying out the several purposes of the present disclosed device and method for display, storage, transportation and preparation of filled or deviled eggs. It is important, therefore, that the claims be regarded as including such equivalent construction and methodology insofar as they do not depart from the spirit and scope of the present invention.

It is an object of the invention to provide a component system for the easy transport, preparation, and sale of boiled eggs and fillings such as a clamshell style folding body having an egg-shaped perimeter which provides a display tray adapted to hold unprepared and prepared deviled eggs.

It is an object of the invention to provide such a clamshell style, or separable body as a means to store, display, and transport the eggs.

It is a further object of the invention to provide prepackaged and flavored filling or filling mix to allow users to fill their own egg halves, and provide indicia labeling the ingredients and the eggs presented holding the ingredients.

It is still another object of the invention to provide a display tray having removably engaged sections which allow for an elevated display and presentation of filled boiled eggs as well as a covered transport device to maintain a clean environment during travel and any storage before eating.

These together with other objects and advantages of the device and method herein, reside in the details of the construction and operation of the invention as more fully hereinafter described and claimed, reference being had to the accompanying drawings and detailed description forming a part thereof, wherein like numerals refer to like parts throughout.

BRIEF DESCRIPTION OF DRAWING FIGURES

FIG. 4 shows a top view of another preferred mode of the device employing removable engageable sections having egg receiving recesses.

FIG. 5 shows a side cross sectional view of the preferred means for removable engagement.

FIG. 6 depicts another preferred means for labeling the prepared eggs providing color codes.

FIG. 7 shows yet an additional preferred mode of the device having a separable first egg-half receiving portion and second clear lid portion which may be employed as a stand and may included recesses for a secure positioning of first half.

FIG. 8 shows the device in a preferred as-used position wherein the lid portion is positioned upside down and employed as an elevated display means and has optional but preferred engagement recesses.

DETAILED DESCRIPTION OF THE PREFERRED EMBODIMENTS OF THE INVENTION

Figure 1:
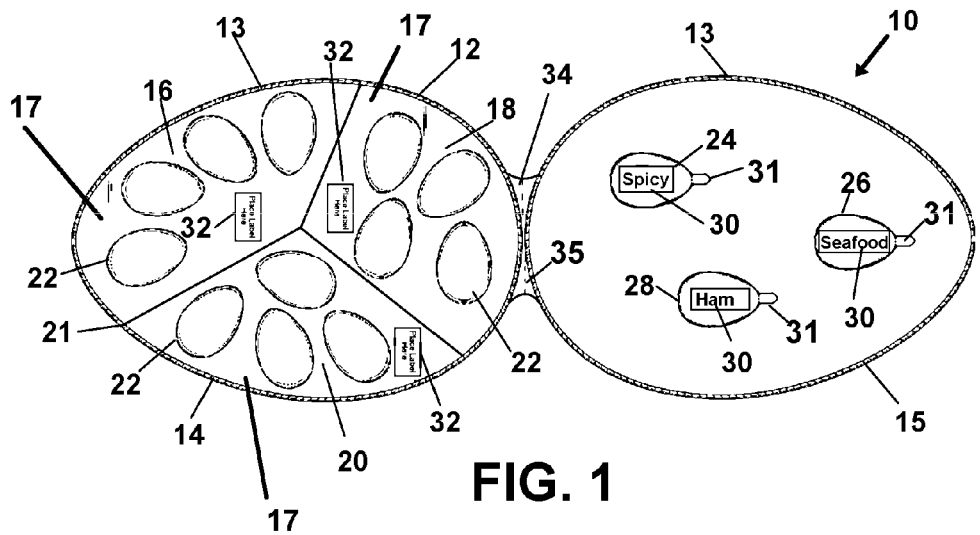
FIG. 1 shows a top view a preferred mode of the clamshell style folding tray device having egg-half receiving recesses on one side, and packets of flavor or filling with labels on the other side.

Now referring to drawings in FIGS. 1-8, wherein similar components are identified by like reference numerals, there is seen in FIG. 1, a top plan view of a particularly preferred mode of the device 10. The body of the device 10 is shown in an engaged clamshell style having a folding container 12 formed upon a first half 14 and having a second half 15 formed to cover and substantially seal with the first half 14 to protect and display unprepared and prepared eggs occupying recesses 22 formed into a top surface of the first half 14. The device 10 may be formed from any one or combination of container forming materials from a group including glass, clear polymeric material, transparent polymeric material, colorized polymeric material, metal, paper, or any other suitable material as would occur to those skilled in the art.

In all modes of the device herein, the second half 15 providing the hinged cover or disengageable cover, is formed preferably of a clear or substantially transparent material such as glass or plastic and in accordance with conventional forming techniques known in the art. This will provide a means to view the eggs in the first half 14 through the cover formed by the second half 15. Such allows the eggs and/or flavorings to be viewed by buyers, users, or hungry eaters. For buyers and users wishing to prepare the eggs, the see-through cover also allows the eggs to be displayed prior to and after preparation, but in a protected and sanitary covered manner.

In use in the as-used closed mode, the first half 14 is engaged to a substantially sealed engagement with the second half 15. Where a clamshell type of housing is employed, the two halves 14, and 15 are folded about a centerline hinge 34 portion such that the halves come together in such a substantially sealed engagement to form a compact and covered storage, display, and transport unit. In the mode of the device providing the hinge 34, it provides a means for folded registered engagement of the first half 14 with the second half 15 of the container, and a means to retain the cover provided by the second half 15 attached to the first half 14 so as not to get lost.

As is shown, the two halves 14, 15 forming the container 12 preferably have a substantially egg shaped and angle-edged perimeter 13 such that when folded, a doubled walled perimeter 13 is provided. Such a perimeter 13 oval in shape has been found as a means for substantially stiffening the trays of the device 10 as is desired for transport, storage, and display. It also provides a user or buyer recognizable design which can be identified from a distance in a retail sales or a banquet or party situation. However it must be noted that the device 10 can be any shape as would occur to those skilled in the art or as needed for the storage, transport and a display means. Such shapes can include square, rectangular, triangular, or multi sided from four to twelve sided for instance.

Shown in the first half 14, of the formed container 12 are a plurality of separate discernable sections 17 providing a means for grouping of the filled or unfilled egg halves which occupy receiving recesses 22 in the plurality of sections 17. In other modes described herein which are equally novel and useful, the sections 17 are formed by removably engageable components configured for registered engagement within a receiving cavity 11 formed in the first half 14 (FIG. 4). In accordance with a current preferred mode the plurality in each section may be three and including a first section 16, second section 18, and third section 20. Each of the sections 17 include a plurality of the egg receiving recesses 22. Eggs being sold conventionally by the dozen, preferably four of each recess 22 are located in a section 17, for a total of twelve recesses adapted to hold a dozen hard-boiled egg halves.

Further, it is preferred that the individual sections 16, 18, 20 are distinctly separated by discernable means to the eater such as identifying indicia such as some type of easily discernable marker 21 providing a means for discerning the separate sections 17. The discernable marker 21 identifying sections may be one or a combination of markers such as a line drawn on the surface of the half 14, a physical barrier, a color barrier, colored sections, a molding of the first half 14 to form a ridge or recesses which define the sections 17 or the user may simply discern the individual sections based on the close grouping characteristics of the recesses 22, within any given section 17 with wider spacing between groups. However, in the current preferred mode the marker 21 is a physical barrier such as a short protruding wall 21. However, the means for visually discerning sections 17 can be one or a combination of a group of sectioning modes including colorizing surfaces of the sections, placing a line between sections, grouping the recesses 22 closely in each section 17, using ink or paint to line between the sections, forming a discernable recess or projection in the surface between the sections, or other modes as would occur to those skilled in the art.

It must be noted that the device 10 is capable of being formed or shaped to include more or fewer distinct sections 17, that may be color coded or distinctly identified by any manner, and is additionally capable of having more or fewer recesses 22 within in a section 17. Consequently the depicted plurality of recesses 22, and plurality of sections 17 is for example and should therefore not be considered limiting in any fashion. For example, the first half 14 may have two distinct sections 17 with four recesses 20 within each section 17 totaling eight recesses 22.

In all modes of the device 10, it is preferred that for each discernible section 17, such the depicted first 16, second 18, and third 20 sections 17, there is included an informational or identifying indicia placement portion 32. This indicia placement portion 32 is adapted to receive and display the indicia or identifying marking such as a flavoring-marked label 30 for the filling of the respective adjacent flavored deviled eggs (not shown) housed in the recesses 22 of that section 17. The indicia placement portions 32 may be color coded, or have text instructing the placement of labels 30 or can use icons or drawings which symbolize the flavor or spice or other aspect of the filling of the eggs in that section 17.

Additionally, the quantity of sections 17 formed or positioned within in the first half 14 are reflected by having a sufficient quantity of flavor packets, and number of labels or other flavor identification indicia. In the current mode, a first packet 24, second packet 26, and third packet 28, engaged to or within the second half 15, are configured to contain sufficient filling squeezable from the container, or filling mix for the user to flavor the filling for the eggs in the first half 14. However, in other modes of the device 10, the packets 24, 26, 28 may be engaged within the corresponding 16, 18, 20 such that the user can view through the preferably substantially transparent top positioned second half 15 when the device 10 is in the closed as-used mode. Means for engagement of the packets within the sections may be accomplished by adhesive, tape, or providing additional recess intended to receive and hold the packets, or any other means for removable engagement of the packets 24,26,28, known in the art.

As mentioned previously, in one preferred mode, the flavoring packets 24, 26, 28 may be mixable dry spices and ingredients such as salt, pepper, paprika, etc. intended to be mixed with the hard-boiled egg yolk, and wet ingredients such as mayonnaise and mustard, provided by the user. However in another preferred modes, the packets 24, 26, 28 may contain the fully prepared filling mixture, of wet and dry ingredients, or other mixed ingredients, to yield a specific flavor which only requires the user to simply squeeze the filling into the egg halves, or to add the boiled egg yolks and then place the filling in the egg halves. Or the packets may contain a positionable flavoring such as avocado mix, or other mixed dressings, which may not contain egg yolks and are positionable in the egg halves right from the packets.

The packets 24, 26, 28 shown currently as substantially egg shaped for aesthetic purposes, and may be formed of any material suitable for storing the above noted ingredients. Further, it is preferred that the packets 24, 26, 28 include a perforated or notched or otherwise eased tear-off portion 31, allowing the user to easily open them and squeeze or pour out the ingredients. It must be noted that the portion 31 may alternatively be a sealable release tab, screw on cap, or compressively engageable tear off portion allowing the user to save the contents of the packet for later use after opening.

Figure 2:
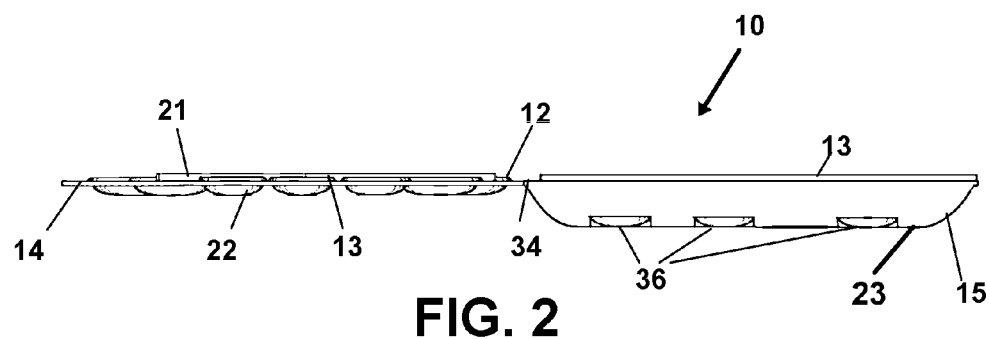
FIG. 2 shows a side view of the device of FIG. 1.

As can be seen in the side view of FIG. 2, the second half 15 of the formed container 12 may additionally include a plurality of recesses 36 intended to engage the packets 24, 26, 28, however they may also be engaged to the first or second half 15 by any means known in the art for removable engagement such as an adhesive, clip, or the like.

In another preferred mode of the device, the centerline hinge 34 may be perforated 35 and thereby rendering the two halves frangible from each other to allow the user to separate the halves 14, 15 as desired. For example, in a preferred means for employing the device 10, the flavoring packets 24, 26, 28 are provided with user-removable labels 30 engaged thereon are removed from the second half of the device 10. The user would then proceed to either mix the packets with wet ingredients, or if the packets 24, 26, 28 include both wet and dry ingredients defining the filling, then simply deposit the filling onto hard-boiled egg halves (not shown) that are placed in sectionalized groups within the receiving recesses 22. The labels 30 may then be placed in the sections 17 which have the egg groups bearing the respective filling from the respective flavor packet.

Figure 3:
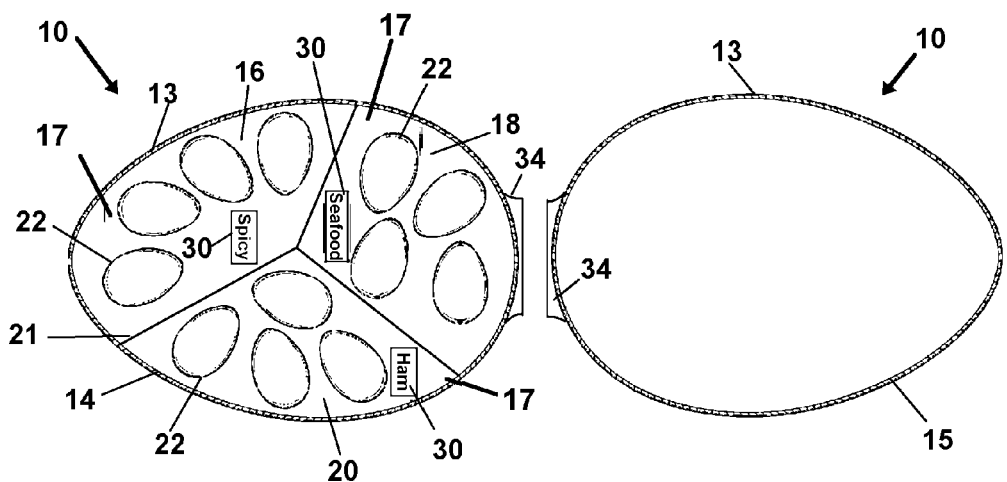
FIG. 3 shows a top view of the device in a possible as-used mode with the second half of the tray disengaged.

Further, shown in FIG. 3 the indicia for labeling the sections is provided by labels 30 which are engaged to the respective label receiving portions 32 of the sections 16, 18, 20 of the first half 14. Optionally but preferred, the second half 15 is disengaged via the perforated 35 centerline hinge 34.

FIG. 4 shows another preferred mode of the device 10 wherein the first half 14 of the formed container 12 has the cavity 11 formed as a tray adapted to receive at least one removably engaged section 40 having a plurality of egg receiving cavities 22 intended to be received into the corresponding section 20 on the formed first half 14. The removable sections 40 may be plastic, or of an other suitable material. As a means for removable engagement the perimeter edge 42 of the section 40 and barrier wall 21 of the half 14 employ complementary means for removable engagement, such as a tongue and groove type engagement shown in FIG. 5.

Shown in the figure, the edge 42 of the section 40 includes a protruding tongue 44 intended for cooperative engagement with a groove 46 formed in the wall portion 21. It must be noted however that the means for removable engagement of the sections 40 to the first half 14 may be any means known in the art and should not be considered limited to the tongue and groove type shown. Additionally shown, the section 40 preferably has a substantially planar bottom wall 45 such as to allow the portion to stand on its own as may be desired for presentation and display of egg halves engaged thereon.

As such, in accordance with the current mode of the device 10, the present invention may be provided in a kit allowing for a means for display, and a sales method, wherein replaceable container sections 40, being members of the kit are sold separately from the container 12. The sections 40, are purchased by the consumer after the initial container 12 is purchased. The replaceable container sections 40 can include prepared or unprepared egg halves which are sealed, and sold separately to the container sections 40 for user engagement within the cavity 11 in the first half 14.

In this kit mode, a user having the container 12 can purchase additional engageable container sections 40 with ready to eat, or ready to prepare deviled egg halves separately at a store. Once home, the sections 40 can simply be cooperatively engaged within the corresponding portion 20 of the cavity 11 in the first half 14 of the container 12. The removable sections 40 can also be used as plate settings at picnics or other events. The corresponding shape of the removable section 40 and the portion 20 in the container 12, or other means for registered engagement in the container 12, are provided to insure proper placement therein adjacent to or within identifying indicia.

FIG. 6 shows another preferred mode of the labels 30 having color coded 48 portions separated by perforations 50. In use the colors 48 can provide a code to correspond to the contents of fillings. For example, green could represent guacamole, while red would represent a hot flavor.

FIG. 7 depicts the device 10 in another preferred mode wherein the first half 14 and second half 15 are provided separately. This may be preferred should the user not desire to employ the perforated hinge of the previously described mode. Further the second half 15 forms a cover portion and therefore preferably has a clear wall such as to allow the user or buyer to view the egg contents and the identifying indicia within the first half 14 when in the closed as-used or engaged mode (not shown).

In this mode the first half 14 may employ indicia such as labels 30 (not shown). The second half 15 forming the cover, optionally but preferred, may have slight recesses 19 formed into the exterior facing surface 23 in a pattern mirroring the cavities 22 of the first half 14. The recesses 19 in the mirrored formation are positioned to register with and be removably engageable with the back side surfaces of the formed cavities 22 when the second half 14 is employed as a means for elevated display, or a stand, for the first half 14. The recesses 19 may also be employed to house the packets and/or the labels 30.

This configuration is seen in FIG. 8 which as noted is a particularly preferred mode of the device 10 depicted in an as-used, display position. As shown, the device 10 is depicted with the second half 15 inverted and employed as a platform or means for elevated display above a support surface such as a table or counter. The second half 15 in FIG. 8 is depicted with a plurality of recesses 19 forming individual depressions on the exterior surface 23 of the second half 15. However the mode of the second half 15 depicted in FIG. 3 may also be used if an engagement upon the exterior surface 23 of the second half 15 is not required.

In use, when in a party or picnic atmosphere, through the employment of either mode of the second half 15 inverted under the first half 14, the user is provided with a means to elevate and display the prepared egg-halves within the first half 14 more noticeably. When the mode of the second half 15 depicted in FIG. 7 is employed to position the device 10 in the as-used display position, a means for prevention of sliding and/or dismount of the first half 14 from its elevated position upon the inverted second half 15 is provided by the positioning of the back side of the cavities 22 of the first half 14 within the recesses 19 formed in a pattern for registered engagement in such a position. In a party or picnic environment where plates and food serving dishes are bumped and subjected to multiple users, a means to avoid sliding and disengagement would be a benefit.

As noted above, the method would employ the described and shown container and modes thereof. Using such the providing party or store would provide reusable container to a user initially, with our without eggs therein. Also while they could be provided without eggs, the store or provider will also provide buyers and users a supply of the sectional components to choose from, having just cavities, or having the halved cooked eggs positioned in those cavities.

With the supply in place, users will be provided access to choose individual sectional components from said supply, to allow for the user so choosing to position them in an engagement with a first side of their purchased or owned reusable container. Once inserted, the sectional components can be covered for transport and storage by the user or buyer by the first engagement with the second half of said reusable container. So engaged, the buyer or user display and give eaters the eggs, and thereafter can repeatedly choose other store or vendor displayed sectional components with halved cooked eggs nested therein, from the supply offered at stores or the vendor, on subsequent occasions. So chosen on subsequent occasions, they too may be easily transported and engaged with the reusable container.

Of course any of the disclosed types of containers and components depicted in the drawings, or described in the specification may be employed in supplemental steps if desired and such is intended included herein.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A method for providing halved hard boiled or deviled eggs to users, employing a reusable container, said container having a first half with a first side configured for engagement with a plurality of individual sectional components each having a plurality of cavities therein having a shape complimentary to an exterior surface of said halved hard boiled or deviled eggs, and a second half positionable in a first engagement with said first half to form a cover atop said first half, comprising the steps of:

providing said reusable container to a user;

providing a supply of said individual sectional components having said halved hard boiled or deviled eggs positioned in said cavities therein;

allowing a user to choose said individual sectional components from said supply for user-positioning in said engagement with said first side of said reusable container where they are coverable for transport and storage by engagement of said first half of said container with said second half of said container, whereby said user can repeatedly choose said individual sectional components with said halved hard boiled or deviled eggs therein from said supply on subsequent occasions for subsequent engagements within said reusable container.

2. The method for providing halved boiled eggs of claim 1 including the additional steps of:

providing said reusable container with said second half in a see-thru configuration configured for viewing any said halved hard boiled or deviled eggs within said reusable container through said cover.

3. The method for providing halved hard boiled or deviled eggs of claim 1 including the additional steps of:

providing said reusable container with said second half configured for a second engagement with a second side opposite said first side of said first half, thereby allowing said user to employ said second half as a pedestal elevating said first half.

4. The method for providing halved hard boiled or deviled eggs of claim 2 including the additional steps of:

providing said reusable container with said second half configured for a second engagement with a second side opposite said first side of said first half, thereby allowing said user to employ said second half as a pedestal elevating said first half.

5. The method for providing halved hard boiled or deviled eggs of claim 1 including the additional steps of:

providing said supply of said sectional components having said halved hard boiled eggs with a yolk removed from said hard boiled egg creating a cavity in said halved hard boiled eggs; and providing a supply of packages of flavored fillings for user employment in filling said egg cavities.

6. The method for providing halved hard boiled or deviled eggs of claim 2 including the additional steps of:

providing said supply of said individual sectional components having said halved hard boiled eggs with a yolk removed from said hard boiled egg creating a cavity in said halved hard boiled eggs; and providing a supply of packages of flavored fillings for user employment in filling said egg cavities.

7. The method for providing halved hard boiled or deviled eggs of claim 3 including the additional steps of:

providing said supply of said individual sectional components having said halved hard boiled eggs with a yolk removed from said hard boiled egg creating a cavity in said halved hard boiled eggs; and providing a supply of packages of flavored fillings for user employment in filling said egg cavities.

8. The method for providing halved hard boiled or deviled eggs of claim 4 including the additional steps of:

providing said supply of said individual sectional components having said halved hard boiled eggs with a yolk removed from said hard boiled egg creating a cavity in said halved hard boiled eggs; and providing a supply of packages of flavored fillings for user employment in filling said egg cavities.

9. The method for providing halved hard boiled or deviled eggs of claim 5 including the additional steps of:

providing said supply of packages of flavored fillings in a plurality of different flavors; and providing labels with said packages of flavored fillings said packages configured for removable engagement to said second half as an identifier of a respective flavor of said flavored filling within said egg cavities of halved hard boiled eggs occupying said cavities of a respective sectional component.

10. The method for providing halved hard boiled or deviled eggs of claim 6 including the additional steps of:

providing said supply of packages of flavored fillings in a plurality of different flavors; and providing labels with said packages of flavored fillings said packages configured for removable engagement to said second half as an identifier of a respective flavor of said flavored filling within said egg cavities of halved hard boiled eggs occupying said cavities of a respective sectional component.

11. The method for providing halved hard boiled or deviled eggs of claim 7 including the additional steps of:

providing said supply of packages of flavored fillings in a plurality of different flavors; and providing labels with said packages of flavored fillings said packages configured for removable engagement to said second half as an identifier of a respective flavor of said flavored filling within said egg cavities of halved hard boiled eggs occupying said cavities of a respective sectional component.

* * * * *